United States Patent

[11] 3,549,967

[72] Inventors Saburo Uemura
4349 Akai-dani, Kamariya, Kanazawa-ku;
Toshiyuki Yamada, 61 Futamatagawa 2,
Hodogaya-ku, both of Yokohama-shi,
Kanagawa-ken; Toshiro Nishikawa, 17-7
Tenjin-cho 4, Fuchu-shi, Toyko; Yasuo
Umezawa, 20 Shimo-iida-machi 891,
Totsuka-ku, Yokohama-shi, Japan
[21] Appl. No. 693,881
[22] Filed Dec. 27, 1967
[45] Patented Dec. 22, 1970
[32] Priority Dec. 30, 1966
[33] Japan
[31] No. 42/1162

[54] BRUSHLESS MOTOR UTILIZING
MAGNETORESISTANCE MEANS HAVING
RECOMBINATION REGIONS
6 Claims, 11 Drawing Figs.

[52] U.S. Cl. ................................................ 318/138,
318/254
[51] Int. Cl. ................................................ H02k 29/00
[50] Field of Search ........................................ 318/138,
254

[56] References Cited
UNITED STATES PATENTS
3,200,316 8/1965 Engel .......................... 318/138
3,305,717 2/1967 Weiss .......................... 318/254

Primary Examiner—Oris L. Rader
Assistant Examiner—Gene Z. Rubinson
Attorney—Hill, Sherman, Meroni, Gross and Simpson ABSTRACT: The invention is directed to a DC motor which is controlled by one or more magnetoresistance devices. The brushless motor includes a rotor having at least two magnetic poles and a stator having a plurality of field coils and a corresponding plurality of pole pieces. A plurality of magnetoresistance means each having an intrinsic semiconductor substrate is connected to the field coils of the motor. Means are provided for varying the resistance of each magnetoresistance element to control the current applied to the motor.

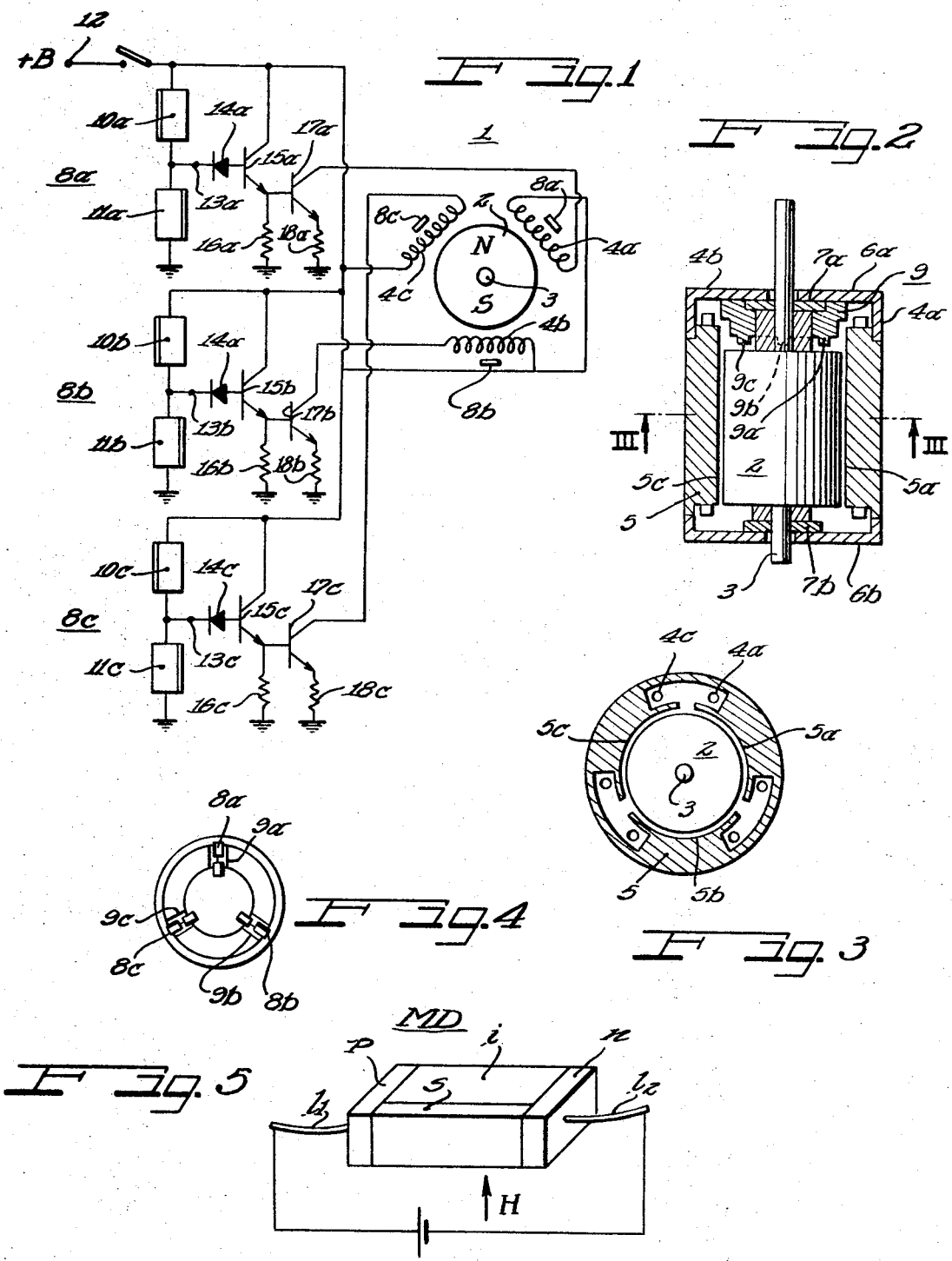

3,549,967

BRUSHLESS MOTOR UTILIZING MAGNETORESISTANCE MEANS HAVING RECOMBINATION REGIONS

BACKGROUND OF THE INVENTION

1. Field of the Invention

This invention relates generally to brushless DC motors, and more particularly to means for controlling the operation of such motors. Specifically, the present invention is directed to a brushless DC motor which is controlled by one or more magnetoresistance elements for controlling the current applied to the field coils of the motor.

2. Description of the Prior Art

Heretofore, brushless DC motors have been developed to overcome various troubles encountered in conventional DC motors. One problem eliminated by the use of brushless DC motors is that caused by the sparks or arcing produced between the brush and commutator by the conventional motor. In place of a brush and commutator arrangement, the brushless DC motor incorporates a detecting device for detecting the rotational position of the rotor and renders a switching circuit conductive to control the current flow to the motor. The rotational position of the rotor may be detected by providing a plurality of Hall generators around the rotor and by switching the generators on and off by the magnetic flux of the rotor or by a plurality of magnetic heads which would induce a voltage in response to the variation of the magnetic flux of the rotor. However, the voltage variation of the electromotive force of such detecting elements is relatively small, for example, approximately 50 microvolts at maximum. Therefore, the switching of the field coils of the motor requires a DC amplification of approximately 40 db. These features impose a severe limitation on the construction of a DC motor which is suitable for conventional use.

SUMMARY OF THE INVENTION

In view of the foregoing disadvantages of brushless DC motors of the prior art, an object of the present invention is to provide a brushless DC motor and control circuit which is relatively simple and inexpensive to manufacture while being very efficient and reliable in operation.

Another object of the present invention is to provide a brushless DC motor which employs a magnetoresistance element to control the current to the windings of the motor.

Another object of the present invention is to provide a brushless DC motor which employs a magnetoresistance element to control the speed of the motor and which elements are adjustable to vary the speed of the motor.

Still another object of the present invention is to provide a brushless DC motor and control circuit which is small in size.

A still further object of the present invention is to provide a brushless DC motor which is self-starting, thereby eliminating the need for additional starting means.

Briefly, the brushless DC motor of the present invention includes a rotor having at least two magnetic poles and a stator having a plurality of field coils mounted on plural pole pieces. A plurality of magnetoresistance means, each having an intrinsic semiconductor substrate including a P-type region and an N-type region separately formed on the substrate and at least one recombination region. The magnetoresistance means are used to control the current flow through the field coils. Furthermore, means are provided for changing the resistance of the magnetoresistance elements in response to the rotation of the rotor. The magnetoresistance elements used in the present invention are fully described and disclosed in a copending U.S. application, Ser. No. 673,658 filed Oct. 9, 1967.

Other objects, features and advantages of the present invention will be more fully realized and understood from the following detailed description when taken in conjunction with the accompanying drawings wherein like reference numerals throughout the various views of the drawings are intended to designate the similar elements or components.

BRIEF DESCRIPTION OF THE DRAWINGS

FIG. 1 is a connection diagram schematically illustrating one example of a brushless DC motor produced according to this invention;

FIG. 2 is a cross-sectional view of the motor assembly exemplified in FIG. 1;

FIG. 3 is a cross-sectional view taken along the line III–III in FIG. 2;

FIG. 4 is a top plan view of a supporter of a detecting device for detecting the rotational position of a rotor of the motor;

FIG. 5 is a perspective view schematically illustrating one example of a magnetoresistance element employed in this invention;

DESCRIPTION OF THE PREFERRED EMBODIMENTS

Figure 6:
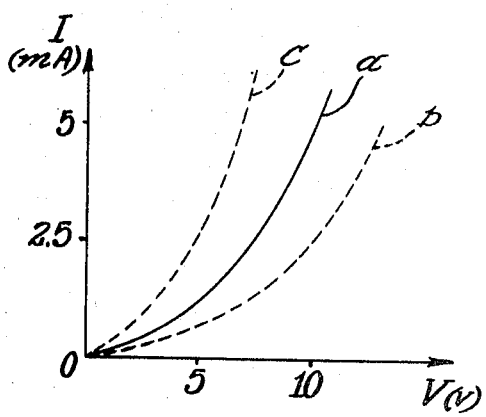
FIG. 6 is a graph showing the power source voltage characteristics of the magnetoresistance element depicted in FIG. 5.

Seen in FIGS. 1 to 4 is one example of a brushless DC motor constructed in accordance with the principles of this invention. A motor assembly designated generally be reference numeral 1 includes a rotor 2 secured for rotation about a shaft 3. The rotor 2 is magnetized with north and south magnetic poles in the radial direction of the rotor, as illustrated in FIG. 1. As best seen in FIGS. 2 and 3, a stator 5 includes three field coils 4a, 4b and 4c wound about corresponding pole pieces 5a, 5b and 5c, and spaced-apart substantially at equal angular distances from each other. The field coils 4a, 4b and 4c are sequentially energized with direct current pulses in such a manner as to rotate the rotor 2. The pole pieces 5a, 5b and 5c are interconnected through the magnetic yoke which is formed by the stator 5, as illustrated in FIG. 3. The axial ends of the stator are closed by covers 6a and 6b each having centrally disposed bearings 7a and 7b, respectively. The bearings 7a and 7b journal the shaft 3 for rotating the rotor 2.

As mentioned hereinabove, the magnetoresistance elements used to control the brushless DC motor of the present invention are fully disclosed and described in U.S. application, Ser. No. 673,658.

The magnetoresistance element MD consists of, for example, an intrinsic germanium substrate $i$ such as depicted in FIG. 5, into which carriers, namely, holes and electrons can sufficiently be injected. The substrate $i$ has formed therein at its both ends P- and N-type regions $p$ and $n$ of relatively high impurity concentrations capable of sufficient injection of the carriers into the substrate $i$. Further, a recombination region S having a comparatively great recombination velocity is formed in the intrinsic region $i$ on one side thereof, extending between the P- and N-type regions $p$ and $n$. The recombination region S can be formed by grinding a selected area of the intrinsic region $i$ with a sandpaper or the like to roughen the area to disturb the crystal lattice therein. The P- and N-type regions $p$ and $n$ have connected thereto lead wires $1_1$ and $1_2$ in the manner of ohmic contact. A forward voltage is impressed to the magnetoresistance element MD, namely, a positive potential is fed to the P-type region $p$ and a negative one is fed to the N-type region $n$. In this case the magnetoresistance element MD exhibits current-voltage characteristics similar to those of a usual diode, as indicated by a curve $a$ in FIG. 6.

Figure 7:
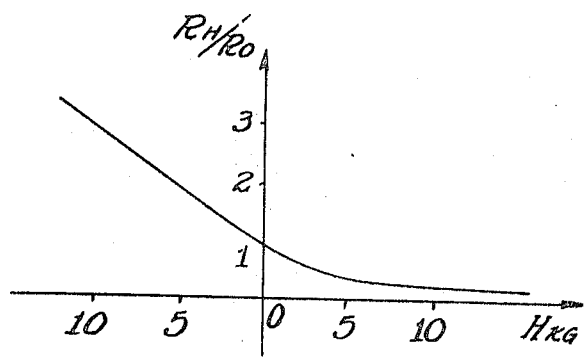
FIG. 7 is a graph showing the magnetic field resistance characteristics of the magnetoresistance element.

Upon application of a magnetic field H to the magnetiresistance element MD at right angles to the current path therein, the current is directed to the recombination region S, with the result that the voltage-current characteristic curve becomes as indicated by $b$, namely, the current decreases and the resistance increases. With a magnetic field applied in a reverse direction, the current goes away from the recombination region S to increase the current and decrease the resistance, as indicated by a curve c. Thus, the resistance of the magnetoresistance element MD can be varied as desired by controlling the magnetic field applied thereto. FIG. 7 shows the variations in resistance ratio $R_H/R_0$ caused by the magnetic field H. As is apparent from the graph, the magnetoresistance element MD responds in different manners to the magnetic fields of opposite directions and its sensitivity is considerably high.

Figure 8:
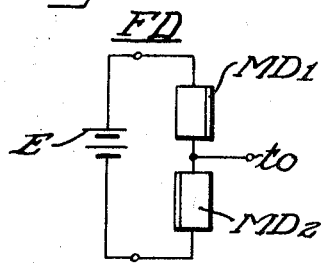
FIG. 8 is a connection diagram illustrating one example of a magnetoresistance pair.

In FIG. 8 there is illustrated one example of a magnetoresistance pair consisting of two magnetoresistance elements such as described above. In the present example, magnetoresistance elements $MD_1$ and $MD_2$ are connected in series to each other in forward direction and are further connected to a power source E. The connection point of the magnetoresistance elements $MD_1$ and $MD_2$ is connected to an output terminal $t_0$. In this case, the magnetoresistance elements $MD_1$ and $MD_2$ are connected opposite in polarity so that a current passing through the elements is turned by a magnetic field of one direction in such a manner as to be directed to the recombination region S in either one of the elements and repelled away from the recombination region S in other element. In this manner, the magnetoresistance pair is constituted by the magnetoresistance elements. With the power source E being, for example, 6 volts, the magnetoresistance pair FD yields from its output terminal $t_0$ a detecting signal of about 3 ±2 volts when exposed to a magnetic field of 2 kilogausses, by which signal a semiconductor element such as a transistor or the like can be directly controlled. Thus, the magnetoresistance pair is highly sensitive. In addition, the magnetoresistance element can be made in such a size as 1 $mm^2$ in cross-sectional area and several millimeters in length, so that the magnetoresistance pair FD can be extremely miniaturized. Further, the magnetoresistance pair FD has three terminals and is convenient for handling, and the resistances of both ends of the magnetoresistance pair substantially constant to ensure that the magnetoresistance pair is stable in concentration.

Such magnetoresistance pairs 8a, 8b and 8c are assembled with the motor 1 as the means for detecting the rotational position of the rotor 2. That is, a ring-shaped supporter 9 formed of a magnetic material, for example, soft iron is mounted on the inside of the cover 6a coaxially with the rotary shaft 3, and the magnetoresistance pairs 8a, 8b and 8c corresponding to the pole pieces 5a, 5b and 5c are mounted on the supporter 9 in opposing relation to the rotor 2. In this case, projections 9a, 9b and 9c are provided on the face of the supporter 9, on which projections the magnetoresistance pairs 8a, 8b and 8c are fixedly mounted adjacent one end face of the rotor 2, as illustrated. The magnetoresistance elements of each magnetoresistance pair are disposed to lie along the radial direction of the rotary shaft 3.

The magnetoresistance pairs 8a, 8b and 8c are respectively connected to the fields coils 4a, 4b and 4c through the transistor circuits in such a manner as shown in FIG. 1. That is, both ends of the series circuit of the magnetoresistance elements 10a and 11a (corresponding to those $MD_1$ and $MD_2$ depicted in FIG. 8) constituting the magnetoresistance pair 8a, are connected between power supply terminal 12 and the ground, and an output terminal 13a of the magnetoresistance pair 8a (corresponding to the terminal $t_0$ in FIG. 8), namely the junction point of the magnetoresistance elements 10a and 11a is connected through a Zener diode 14a to the base of a transistor 15a, the collector of which is connected to the power supply terminal 12 and the emitter of which is grounded through a resistor 16a. Further, the emitter of the transistor 15a is connected to the base of a transistor 17a, the emitter of which is grounded through a resistor 18a and the collector of which is connected to one end of the field coil 4a, the other end of the field coil 4a being connected to the power supply terminal 12.

The other magnetoresistance pairs 8b and 8c are similarly connected to the field coils 4b and 4c, so that similar components to the above-described ones are identified by the same reference numerals but with different suffices b and c. No further detailed description will be given thereon.

Figure 9:
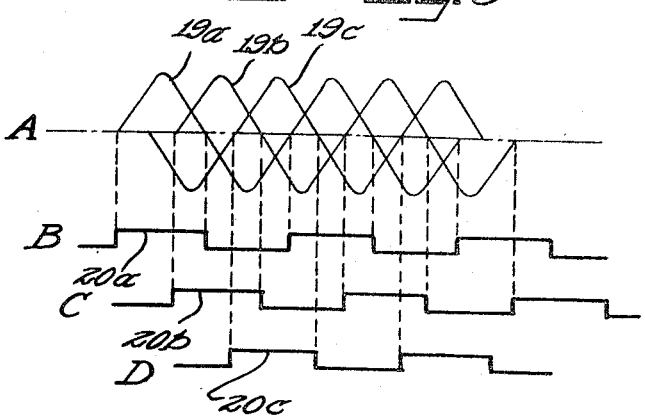
FIG. 9 is a diagram for explaining the operation of the motor of this invention.

With such an arrangement as has been described in the foregoing, rotation of the rotor 2 leads to application of a three-phase sine wave magnetic field to the magnetoresistance pairs 8a, 8b and 8c. This provides, at the output terminals 13a, 13b and 13c, output voltages 19a, 19b and 19c such as shown in FIG. 9, which are displaced 120° apart in phase. As a result of this, the Zener diodes 14a, 14b and 14c are made conductive by the positive portions of the output voltages to conduct the transistors 15a and 17a, 15b and 17b, 15c and 17c, sequentially displaced 120° apart in phase. Consequently, the field coils 4a, 4b and 4c connected to the transistors 17a, 17b and 17c are sequentially supplied with rectangular wave signals 20a, 20b and 20c such as shown in FIGS. 8B, 8C and 8D, which are phased 120° apart. In this manner, the rotor 2 is driven.

In accordance with this invention, the use of the magnetoresistance pairs provides a brushless DC motor of the type in which the field coils are switchingly supplied with DC current. Further, the magnetoresistance pairs 8a, 8b and 8c are remarkedly high in sensitivity and hence are capable of detecting a relatively low intensity magnetic field, as previously mentioned, so that the magnetic field of the rotor 2 can readily be detected, even if it is considerably low in intensity. In addition to the above, the use of the magnetoresistance pairs permits the output transistors 17a, 17b and 17c to be switchingly controlled by the detected outputs entirely without or with slight amplification of the outputs. This ensures stable operation of the detecting device and greatly simplifies its adjustment.

Further, the magnetoresistance pair is very small in size and hence can be disposed in the motor 1 without changing the configuration of the motor significantly. Therefore, the motor does not become bulky and can be made brushless under substantially the same conditions as those of the conventional motors.

Although the supporter 9 may be formed of a nonmagnetic material, it is preferred to make the supporter 9 of a magnetic material, for example, soft iron, because when the magnetoresistance pairs 8a, 8b and 8c are mounted on the projected portions 9a, 9b and 9c of the supporter 9, magnetic fluxes are well concentrated on the projected portions to enhance the sensitivity of the detecting device.

While the present invention has been described with reference to a brushless DC motor of three poles, the principles of this invention can be applied to brushless DC motors having two or more poles. In case of two poles, it is necessary to drive the rotor by some means at the start of the rotation. Since the magnetoresistance pair is capable of detecting a static magnetic field as above described, the rotor can be automatically rotated merely by turning the power source switch to its on state. This eliminates the necessity of the provision of a specific starting means.

Figure 10:
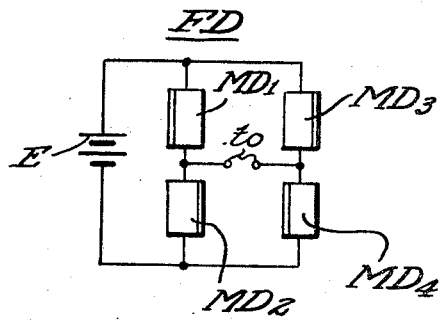
FIG. 10 is a connection diagram illustrating another example of the magnetoresistance pair.

In the foregoing, the magnetoresistance pair FD is constituted by two magnetoresistance elements, but it may be substituted with a magnetoresistance bridge employing four magnetoresistance elements $MD_1$, $MD_2$, $MD_3$ and $MD_4$ connected in the form of a bridge as depicted in FIG. 10. In this case, adjacent magnetoresistance elements are connected opposite in polarity relative to a magnetic field.

Figure 11:
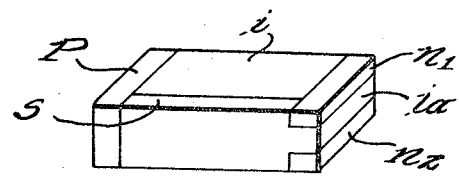
FIG. 11 is a perspective view illustrating still another example of the magnetoresistance element.

Further, the above examples employ the magnetoresistance element MD having the P- and N-type regions p and n each being undivided. However, it is also possible to use a magnetoresistance element such as illustrated in FIG. 11 in which the N-type region n is divided into two portions $n_1$ and $n_2$, one formed on the side of the recombination region S and the other on the opposite side therefrom, and the intrinsic region i is extended between the portion $n_1$ and $n_2$, as indicated at $i_a$. That is, the magnetoresistance element serves as a kind of transistor employing the extended portion $i_a$ as a base, the portion $n_1$ as an emitter and the portion $n_2$ as a collector, by which current variations in the intrinsic region $i$ due to a magnetic field is amplified and is then led out.

Therefore, the present invention provides a brushless DC motor and a control circuit which is simple and efficient in operation and is easy to manufacture. Accordingly, it will be understood that variations and modifications may be effected without departing from the spirit and the scope of the novel concepts of this invention.

We claim:
1. A brushless DC motor comprising:
   a. a rotor having at least two magnetic poles;
   b. a stator having a plurality of field coils mounted on plural pole pieces thereof;
   c. a plurality of magnetoresistance elements each consisting of an intrinsic semiconductor substrate including a P-type region and an N-type region separately formed in the substrate and at least one recombination region, the magnetoresistance elements being respectively disposed opposite to the magnetic poles for changing the resistance of each magnetoresistance element in accordance with the magnetic flux of the rotor; and
   d. means for controlling currents separately applied to the field coils in accordance with the variations in the resistance of each magnetoresistance element; wherein the magnetoresistance elements are disposed in pairs in series connection, each pair of the elements controlling a current of each field coil.

2. A brushless DC motor as claimed in claim 1 wherein the magnetoresistance elements of each pair are connected in such a manner that the resistances of the elements vary in opposite relation to each other in response to the rotation of the rotor.

3. A brushless DC motor comprising a rotor having at least two magnetic poles, a stator having a plurality of field coils mounted on plural pole pieces thereof, a plurality of pairs of magnetoresistance elements each consisting of an intrinsic semiconductor substrate including a P-type region and an N-type region separately formed in the substrate and each having at least one recombination region, the magnetoresistance elements being mounted in pairs adjacent each other and disposed opposite the magnetic poles of the rotor for changing the resistance of each magnetoresistance element in accordance with the magnetic flux of the rotor and each of the magnetoresistant element pairs comprising a first magnetoresistance element which has its resistance increased as a magnetic pole passes nearby and the corresponding magnetoresistance element pair having its resistance decreased as the magnetic pole passes nearby, and means for controlling currents separately applied to the field coils in accordance with variations in the resistance of each magnetoresistance element.

4. In a brushless DC motor according to claim 3 wherein the recombination region of the first one of each of said pairs of magnetoresistance elements is formed on said first of said pair of magnetoresistance elements so that the magnetic flux from an adjacent pole causes deflection of carriers toward some recombination region and the recombination region of the associated pair of said magnetoresistance element is formed on the side so that an adjacent pole causes carriers to be deflected away from said recombination region.

5. In a brushless DC motor according to claim 4 wherein said recombination regions are formed by roughening the surface of the magnetoresistance elements to disturb the crystal lattice.

6. A brushless DC motor comprising:
   a. a rotor having at least two magnetic poles;
   b. a stator having a plurality of field coils mounted on plural pole pieces thereof;
   c. a plurality of magnetoresistance elements each consisting of an intrinsic semiconductor substrate including a P-type region and an N-type region separately formed in the substrate and at least one recombination region, the magnetoresistance elements being respectively disposed opposite to the magnetic poles for changing the resistance of each magnetoresistance element in accordance with the magnetic flux of the rotor; and
   d. means for controlling currents separately applied to the field coils in accordance with the variation in the resistance of each magnetoresistance element; wherein the magnetoresistance elements are disposed in groups of four elements comprising two pairs in parallel and each group controlling a current of each field coil.